(12) United States Patent
Vanderhaegen et al.

(10) Patent No.: US 7,787,483 B2
(45) Date of Patent: Aug. 31, 2010

(54) METHOD FOR IMPULSE NOISE MONITORING, RELATED NETWORK TERMINAL, NETWORK NODE AND NETWORK MANAGER

(75) Inventors: Dirk Vanderhaegen, Wemmel (BE); Danny Van Bruyssel, Temse (BE)

(73) Assignee: Alcatel Lucent, Paris (FR)

( * ) Notice: Subject to any disclaimer, the term of this patent is extended or adjusted under 35 U.S.C. 154(b) by 256 days.

(21) Appl. No.: 11/966,186

(22) Filed: Dec. 28, 2007

(65) Prior Publication Data

US 2008/0165838 A1 Jul. 10, 2008

(30) Foreign Application Priority Data

Jan. 10, 2007 (EP) .................................. 07290038

(51) Int. Cl.
H04L 12/26 (2006.01)
H04B 17/00 (2006.01)

(52) U.S. Cl. ......................... 370/426; 370/524; 375/227

(58) Field of Classification Search ....................... None
See application file for complete search history.

(56) References Cited

U.S. PATENT DOCUMENTS

| | | | |
|---|---|---|---|
| 7,058,190 B1 * | 6/2006 | Zakarauskas et al. ........ | 381/122 |
| 2004/0203392 A1 * | 10/2004 | Hsu et al. ..................... | 455/62 |
| 2004/0264507 A1 * | 12/2004 | Cho et al. .................... | 370/480 |
| 2006/0056305 A1 * | 3/2006 | Oksman et al. .............. | 370/252 |
| 2006/0107174 A1 * | 5/2006 | Heise ........................... | 714/755 |
| 2006/0150055 A1 * | 7/2006 | Quinard et al. .............. | 714/752 |
| 2006/0282750 A1 | 12/2006 | Takeuchi | |
| 2008/0101407 A1 * | 5/2008 | Khan et al. .................. | 370/468 |
| 2008/0165839 A1 * | 7/2008 | Landau et al. ............... | 375/227 |

FOREIGN PATENT DOCUMENTS

| | | |
|---|---|---|
| EP | 1513282 A2 | 3/2005 |
| WO | WO 2005/086405 A2 | 9/2005 |
| WO | WO 2006/102225 A2 | 9/2006 |

OTHER PUBLICATIONS

ITU-Telecommunication Standardization Sector; CD-021; AT&T; "G.lt Selt measurements" Study Group 15, Denver, Colorado, Sep. 25-29, 2006.

(Continued)

*Primary Examiner*—Min Jung
(74) *Attorney, Agent, or Firm*—Harness, Dickey & Pierce, P.L.C.

(57) ABSTRACT

In a network for digital data packet transmission, reception quality of received data packets is sensed (111) by a remote terminal (101). Thereupon, a bit string indicative for the sensed reception quality is generated (112). This bit string or a compressed version of this bit string is transferred (114) in real-time over a management channel to a first central processing unit (121) in a network node (102) where the bit string is compacted or processed. By processing the bit string, the first central processing unit (121) may determine impulse noise characteristics. Alternatively, the bit string or a compressed or compacted version thereof may be forwarded to a second central processing unit (131) in a network manager (103) that processes the bit string and determines impulse noise characteristics.

30 Claims, 1 Drawing Sheet

OTHER PUBLICATIONS

ITU-Telecommunication Standardization Sector; CD-047; BT; "G.lt Impulse Noise Characterisation" Study Group 15, Denver, Colorado, Sep. 25-29, 2006.

Patrick N'Da et al.: "Impulse noise correction in SDSL using retransmission request" France Telecom/R&D European Telecommunications Standards Institute TM/TM6#40; Nov. 14-17, 2005; Vienn, Austria.

ITU-Telecommunication Standardization Sector; TD 158R1; G.997.1 Editor; "G.ploam:G.vdsl: Report of ad-hoc session on Impulse Noise Monitoring" Study Group 15, Geneva, Oct. 30 to Nov. 10, 2006.

Tanenbaum, Andrew S., *Computer Networks*. Fourth Ed., 2003, Sections 3.3 and 3.4.

* cited by examiner

Fig. 1

METHOD FOR IMPULSE NOISE MONITORING, RELATED NETWORK TERMINAL, NETWORK NODE AND NETWORK MANAGER

FIELD OF THE INVENTION

The present invention generally relates to impulse noise monitoring in digital data communications, i.e. the detection and characterisation of impulse noise in received data packets. Impulse noise is noise that is induced through electromagnetic coupling in a communication line by external noise sources and that is relatively short in duration. Switching a light switch on/off for instance may generate a transient effect on the supply voltage and current, resulting in noise impulses on the telephone line that may convey digital data, e.g. packed in Discrete Multi Tone (DMT) symbols when the telephone line is deployed as a DSL loop. Depending on the amplitude and duration of the impulse, the impulse noise will result in quality degradation and/or errors in the received data packets. It is noticed that within the context of the current patent application, data packets must be interpreted broadly to cover any fixed length or variable length group of data bytes or bits that is transferred as a single entity. In other words, it covers data frames, data cells, data words, data symbols, data segments, etc. An example of a data packet is for instance a DMT symbol sent over an ADSL (Asymmetric Digital Subscriber Line) or VDSL (Very High Speed Digital Subscriber Line) loop.

In the case of dimmers, fluorescent lights, Christmas rope lights, switched mode power supply units (PSUs) of TVs or PCs, video recorders, electronic transformers, security lights, etc. in the vicinity of a digital communication line, the noise impulses impairing digital data transfer over that communication line may have a repetitive character. Such repetitive noise impulses are still short in duration and therefore called repetitive electrical impulse noise (REIN). Typically, the time in between two successive noise impulses may be as small as 10 milliseconds (ms) in Europe or 8.3 ms in USA because the noise impulses are usually the result of on/off transitions at a rate based on the frequency of the electrical power, which is 50 Hertz (Hz) in Europe and 60 Hz in USA. In the example of a light dimmer for instance, the intensity of the light is controlled through electrical circuitry that switches the light on and off. The ratio between the on- and off-time determines the light intensity. Each on/off transition causes a noise impulse on neighbouring communication lines. The trigger for the on/off switching of the light is derived from the frequency of the electrical power grid, hence resulting in noise impulses as frequent as every 10 ms (in Europe) or 8.3 ms (in USA).

With the introduction of triple play service deployment, i.e. concurrent deployment of High Speed Internet (HSI) access, conversational point-to-point services such as VoIP or conversational IP multimedia services, and client-server based services such as broadcast TV (BTV), the characterization of impulse noise has become of major importance to for instance DSL operators. Whereas High Speed Internet access was a best-effort type of service, voice and video services of the conversational or client-server type require end-to-end quality of service. Operators need stable, high-quality broadband connections that can deliver these new services effectively and reliably.

BACKGROUND OF THE INVENTION

Existing mechanisms to mitigate errors in digital data transmission due to impulse noise can be categorized as either retransmission mechanisms, forward error correction (FEC) mechanisms, or troubleshooting measures.

Retransmission mechanisms consist in repairing corrupted data packets by re-sending the data packets for which a retransmission request has been received. The retransmission request can be issued by the receiver that has received an irrecoverably affected data packet (such implementations are often referred to as ARQ or Automatic Repeat Request mechanisms) or alternatively can be issued by a timer waiting for the receiver to acknowledge the reception of a data packet but not receiving such acknowledgement within a predefined time from the sending of that data packet. Combinations of both, i.e. retransmission requests from the receiver for irrecoverably damaged packets and retransmission requests from a timer in or near the transmitter for unacknowledged or lost data packets, are described in literature as well.

Retransmission is typically done at the higher layers, i.e. the protocol stack layers above the PMD (physical medium dependent) layer such as the TCP layer or Transmission Control Protocol layer.

Retransmission has also been suggested for the physical layer, for instance in the ETSI SDSL standard contribution 054t34 from France Telecom entitled "*Impulse Noise Correction in SDSL Using Retransmission Request*". In this standard contribution, it is proposed to implement at the PMD (Physical Medium Dependent) layer of an SDSL (Symmetric Digital Subscriber Line) transmitter recording of recently transmitted data segments. The SDSL receiver can request retransmission of a data segment that was corrupted through the occurrence of impulse noise on the copper pair by indicating the segment number of the data segment to be re-sent. The SDSL transmitter receiving a retransmission request, handles the request in priority.

Other retransmission schemes can be found in A. S. Tanenbaum, "Computer Networks", Fourth Ed., 2003, more particularly in section 3.3 and 3.4 thereof.

Existing retransmission mechanisms such as TCP retransmission are useless in case of real-time services such as VoIP (Voice over IP) or broadcast TV services because retransmission mechanisms are plagued by high delays due to the inherent latency. Further, retransmission mechanisms are inefficient or useless on communication links with a high frequent, repetitive loss resulting from REIN due to the bandwidth expansion inherent to retransmission.

Forward error correction (FEC) mechanisms are based on the calculation of a FEC code, i.e. an amount of redundant bits or bytes that are added to each data packet and can be used in the receiver's decoder to recover a limited number of transmission errors such as errors due to impulse noise. Popular FEC mechanisms are for instance Reed-Solomon encoding, Parity-Based encoding, Harris Ascent encoding, . . .

If for instance Reed Solomon (RS) encoding is used to cancel impulse noise effects, the digital data words are extended with a redundant Reed Solomon code before transmission. Upon receipt, the redundant Reed Solomon code enables the decoder to detect and correct errors in the digital data words induced by noise. At the price of some overhead, Reed Solomon coding enables to resolve errors resulting from any type of impulse noise. Reed Solomon encoding is usually combined with interleaving techniques in order to spread the errors resulting from a noise impulse over several data words, thereby improving the capability of the Reed Solomon decoder to correct all errors induced by the noise impulse.

Forward error correction mechanisms like Reed Solomon encoding and interleaving are typically configured using a parameter called INP or Impulse Noise Protection. The higher the INP value, the higher the Reed Solomon overhead and consequently the lower the effective data rate on the line. The lower the INP value, the lower the duration of impulse noise bursts against which protection is provided. Optimal configuration of the INP parameter requires monitoring and precise characterization of the impulse noise. In other words, an accurate picture of the impulse noise and how it affects the data packets, e.g. the DMT symbols, needs to be available in order to optimally configure the forward error correction parameters on a digital communication line.

A known method for impulse noise monitoring has been described in the ITU-T agreed baseline text TD 158R1 (WP 1/15) entitled "*G.ploam: G.vdsl: Report of ad-hoc session on Impulse Noise Monitoring*", a temporary document, published as a result of an ad-hoc session held on 3 Nov. 2006. In the impulse noise monitoring method described therein and illustrated by the first figure, the remote end terminal senses quality degradation of received DMT symbols and generates an indication for severely degraded DMT symbols. The impulse noise indications are thereafter compacted to basic statistical information like anomaly histograms of the impulse length (IL) and the impulse inter arrival time (IAT). These statistical data that remain available in the known method for INP parameter setting occupy limited storage capacity. However, part of the information on the sensed impulse noise is lost irrecoverably in the prior art impulse noise monitoring method as a result of the statistical data generation. For instance the timing information on individual noise pulses, individual error lengths, individual inter arrival times, the cross-correlation between the error length and the inter arrival time, etc. is lost as a result of which the possibility to precisely characterise the impulse noise for FEC parameter configuration is lost too. Further, as a result of the compacting function being implemented in the remote terminal's software or hardware, it is hardly possible to introduce other histograms or statistics that could improve the INP parameter setting, like for instance two-dimensional impulse length—inter arrival time histograms, Fourier transforms, sliding window based histograms, histograms based on pulse gap bridging, or any interpretation or combination thereof, because this would require an upgrade of the software/hardware of the remote terminals. Such upgrade is a slow process requiring all manufacturers to modify their products, typically as a result of international standard setting or a market-driven demand for a de-facto standard.

Similar impulse noise monitoring methods with same disadvantages are described in the International Patent Applications WO 2005/086405 entitled "Impulse Noise Management" and WO 2006/102225 entitled "Method and Apparatuses of Measuring Impulse Noise Parameters in Multi-Carrier Communication Systems".

Lastly, in cases where no forward error correction mechanisms are available or where no INP values that are sufficiently high to correct all impulse noise errors, the solution to cope with impulse noise may consist in troubleshooting, i.e. finding the source in the customers home and taking measures in order to remove the impulse noise source. In case of a DSL line for instance, removing part of the inhouse wiring and replacing it by better wires may reduce the impulse noise effects to an acceptable level. To help identify and diagnose the source of impulse noise such that remedial action can be taken to remove the source or alleviate the problem, operators demand solutions for monitoring and characterisation of the impulse noise as close as possible to the physical phenomenon.

Known methods to monitor and characterise impulse noise for troubleshooting purposes are based on Single-Ended Line Testing (SELT). Examples are for instance described in ITU-T standard contributions CD-047 from British Telecom and CD-021 from AT&T. SELT however is an off-line method that involves service interruption. In particular for impulse noise characterisation where observation is needed over relatively long periods, for instance a day or several days, the known SELT based techniques will lead to undesirable or unacceptable long service interruption. In addition, the known SELT techniques are seen as measurement methods implemented centrally. Measuring impulse noise at the central side in order to diagnose impulse noise induced at or near the customer premises, is obviously not efficient. Transferring the known SELT based measurement techniques from the central side to the remote, customer premises equipment raises issues on retrieval of the information to the central side. Furthermore, the known SELT based methods estimate amplitude, duration and inter arrival time distributions, which are inadequate parameters for identification of an impulse noise source.

It is an objective of the present invention to provide a method for monitoring impulse noise which overcomes the above mentioned drawbacks of the prior art methods. More particularly, it is an objective to disclose a method for impulse noise monitoring that enables online, detailed characterisation of impulse noises, and/or identification of the impulse noise sources, without service interruption nor issues to collect information from the remote end terminals. It is further objective to enhance the information available for impulse noise characterisation and impulse noise source identification. Another objective is to simplify the upgradeability of the compacting and processing software/hardware that interprets the information collected through impulse noise monitoring.

SUMMARY OF THE INVENTION

According to the invention, the above defined objectives are realized and the shortcomings of the known prior art solutions are overcome by the method for monitoring impulse noise defined by an example embodiment, comprising the steps of:
  sensing reception quality of received data packets;
  generating a bit string indicative for the reception quality sensed, the bit string containing at least one bit per received data packet; and
  transferring the bit string or a compressed version of the bit string in real-time over a management channel to a first central processing unit in the network for compacting and/or processing thereof.

This way, by sending the string of bits indicative for the sensed reception quality of data packets in real-time, eventually with some delay, to a central processing unit in the network, where it can be stored, compacted, visualized and/or processed with the latest available algorithms, a raw stream of information indicative for the sensed reception quality from which an unlimited amount of impulse noise qualifying parameters can be calculated, becomes available to the central processing unit in the network. Through the use of a management channel, the bit string is transferred online to the first central processing unit, without any service interruption to the end user. Since the compacting and/or processing is done centrally in the first processing unit (or in a second processing unit whereto the bit stream optionally can be forwarded as will be explained below), there is no need to update the software/hardware of the equipment that detects and forwards the reception quality and that preferably resides in remote customer premises equipment, e.g. an ADSL CPE modem.

It is noticed that a string of bits indicative for the presence of impulse noise in data packets may be expected to have a sparse density as an error will occur relatively seldom, the bit string can optionally be compressed before being transferred to the first central processing information without losing any information contained in the original raw bit string.

It is further noticed that sensing the reception quality of the received data packets in the method according to the present invention may rely on any known or future technique that detects errors or erasures in received data packets, that measures an increase of the noise level not necessarily resulting in errors in a service at the current data rate but which could lead to errors in future services that require higher data rates, that measures the signal-to-noise ratio (SNR), the bit error rate (BER), or alternate parameters indicative for reception quality degradation.

In addition to the method for monitoring impulse noise defined by an example embodiment, the current invention relates to a corresponding network terminal as defined by an example embodiment, a corresponding network node as defined by an example embodiment, and a corresponding network manager as defined by an example embodiment.

As is indicated by additional example embodiment, the bit string or the compressed version of the bit string may be transferred over a physical layer management channel to the first central processing unit. Examples in case of a DSL network, are the Digital Subscriber Line Embedded Operations Channel (EOC), or in-band transfer over a TR-069 protocol based management channel.

As is further indicated by an example embodiment, the bit string in its simplest version may contain one bit per received data packet, e.g. 1 bit per received DMT symbol in a DSL receiver, the bit e.g. being set 1 in case the reception quality of the DMT symbol exceeds a certain threshold and e.g. being set 0 in case the reception quality of the DMT symbol stays below that threshold, or vice versa. Alternatively, as is indicated by an example embodiment, the bit string may contain plural bits per received data packet, these bits being a quantitative indication for the quality of the received data packet.

Whereas an implementation with a single bit per data packet cannot provide amplitude information on the sensed quality, plural bits can provide amplitude information on the sensed quality or quality degradation enabling all kinds of statistical analyses in impulse noise.

The method according to the present invention may advantageously be performed by Digital Subscriber Line Customer Premises Equipment (DSL CPE), in which case the received data packets correspond to Discrete Multi-Tone (DMT) symbols.

This is defined by an example embodiment. Since the downstream DMT symbols in ADSL are sent at a pace of about 4000 DMT symbols per second, the bit string according to the present invention may be transferred at low speed, e.g. 4 kbit/s over the PMD EOC channel defined in the various ADSL standards. For VDSL, about 4000 DMT symbols or about 8000 DMT symbols are downstream sent per second, as a result of which the bit string according to the present invention may be upstream transferred at a rate of about 4 kbit/s or about 8 kbit/s.

Optionally, as defined by an example embodiment, the bit string or the compressed version of said bit string may be transferred to a first central processing unit in a Digital Subscriber Line Central Office (DSL CO), e.g. a single CPU collecting this information for all DSL lines terminated on one and the same DSLAM, or, as is indicated by an example embodiment, a CPU on each line termination (LT) board in the Digital Subscriber Line Central Office (DSL CO) collecting this information for all DSL lines terminated on one and the same LT board in a DSLAM.

An optional feature of the method according to the present invention, defined by an example embodiment, is that the bit string or the compressed version of the bit string may be regularly autonomously transferred from a remote end network terminal to the first central processing unit.

In an alternative embodiment of the method according to the present invention, defined by an example embodiment, transfer of the bit string or the compressed version of the bit string is regularly autonomously requested by the first central processing unit.

In yet another alternative embodiment of the method according to the present invention, defined by an example embodiment, an indication signal is sent to the first central processing unit after generation of the bit string, and the bit string or the compressed version of the bit string to the first central processing unit upon request of the first central processing unit.

Summarizing, transfer of the compressed or uncompressed bit string to the first central processing unit may take place autonomously on initiative of the remote terminal hosting the impulse noise monitoring function, on request of the first central processing unit, or after communication between the remote end terminal and the first central processing unit indicating that the bit string has been generated and that the first central processing unit is ready to handle it. The second and third variant obviously require additional signalling between the remote terminal and the node hosting the first central processing unit, and storage capacity in the remote terminal to store the bit string at least until it is requested by the first central processing unit.

Optionally, as defined by an example embodiment, the method according to the present invention contains the additional steps of:
generating one or more subsequent bit strings; and
storing the bit string and subsequent bit strings or compressed versions thereof in a first-in-first-out memory at a remote end network terminal.

This implementation with fifo memory in the remote terminal is preferred when the bit string is transferred only on request of the first central processing unit.

As is further indicated by an example embodiment, in a variant of the invention with first-in-first-out memory in the remote terminal, one or more of the bit string and the subsequent bit strings or compressed versions thereof may be transferred at a time from the first-in-first-out memory to the first central processing unit.

After transfer thereof to the first central processing unit, the transferred bit strings or compressed versions thereof may be removed from the first-in-first-out memory in the remote terminal, as is specified by an example embodiment.

This way, storage capacity in the first-in-first-out memory is released as quickly as possible for additional subsequent bit strings.

In a more advanced alternative implementation of the method according to the present invention, defined by an example embodiment, the transferred bit string and subsequent bit strings or compressed versions thereof are removed from the first-in-first-out memory in the remote terminal only after acknowledgement of correct reception by the first central processing unit.

This way, loss of information due to incorrect transfer of one or more of the bit string and the subsequent bit strings over the upstream management channel can be avoided as the bit string and the subsequent bit strings will remain available for retransmission in the first-in-first-out memory until correct receipt has been acknowledged.

A further option of the FIFO-based implementation of the current invention, defined by an example embodiment, is that the bit string and subsequent bit strings or compressed versions thereof may be discarded from the first-in-first-out memory upon overflow of the first-in-first-out memory.

Typically, the oldest ones of the bits string and subsequent bit strings in the FIFO memory will be discarded to anticipate overflow by freeing up memory space for new subsequent bit strings. It is however not necessary and the current invention is obviously not restricted to discarding the oldest bit strings in the FIFO memory to anticipate overflow.

Yet another option is that the method according to the invention may comprise regularly autonomously transferring the bit string or the compressed version of the bit string or a compacted bit string from the first central processing unit to a second central processing unit in a network manager. This option is defined by an example embodiment.

Alternatively, as defined by an example embodiment, the method according to the invention may comprise regularly autonomously requesting to the first central processing unit transfer of the bit string or the compressed version of the bit string or a compacted bit string by a second central processing unit in a network manager.

In yet another alternative implementation of the method according to the invention, defined by an example embodiment, an indication signal is sent to a second central processing unit in a network manager upon event detection by the first central processing unit compacting or processing the bit string or the compressed version of the bit string, and the bit string or the compressed version of the bit string or a compacted version of the bit string is transferred from the first central processing unit to the second central processing unit upon request of the second central processing unit. As already indicated earlier, the bit string or a compressed or compacted version thereof may be forwarded from the first central processing unit, e.g. residing in a network node such as a DSLAM, to a second central processing unit, e.g. residing in a network manager used to manage the network of one or several operators. The compacted version of the bit string may consist of histograms or statistical information extracted from the bit string or the compressed version of the bit string by the first central processing unit. Also, the pace at which bit strings are forwarded to the second central processing unit may be lower than the frequency at which bit strings are transferred from the remote terminal to the first central processing unit. In particular when the network manager that hosts the second central processing unit manages a large network or even plural networks, overloading the network manager may be avoided this way.

Further summarizing, the bit string, the compressed or compacted version thereof can be sent autonomously to the second central processing unit on initiative of the first central processing unit, can be sent only on request of the second central processing unit, or can be sent upon communication between the first and second central processing units indicating an event, e.g. an impulse noise burst. The latter two implementations obviously require additional signalling between the first and second central processing units, as well as sufficient storage capacity in the first central processing unit to memorize the bit string until it is requested by the second central processing unit.

Optionally, as defined by an example embodiment, the method for monitoring impulse noise according to the present invention may comprise the additional steps of:

generating one or more subsequent bit strings;

transferring the subsequent bit strings or compressed versions thereof also to the first central processing unit; and storing the bit string and the one or more subsequent bit strings compressed versions thereof in a first-in-first-out memory at the first central processing unit This way, by implementing a fifo in or near the first processing unit, storage requirements for the bit string in remote terminals may be reduced. Thus, the errors or more generally the information indicative for the sensed reception quality may be grouped in records that are eventually time stamped. These records are transferred as subsequent bit strings to the first central processing unit where they are stored in memory. Such central storage of the records shall minimize the storage requirements for the remote terminals. The implementation with a fifo in or near the first central processing unit is also preferred in case the bit strings can be forwarded to a second central processing unit on request of the latter one.

To forward the bits strings from the first central processing unit to a second central processing unit residing in a network manager, one or more of the bit string and the subsequent bit strings can be transferred at a time, as is indicated by an example embodiment. Thereafter, the transferred bit strings may be removed immediately from the FIFO memory in or near the first central processing unit, as specified by an example embodiment, or may be removed from that FIFO memory only after acknowledgement of correct receipt by the second central processing unit, as defined by an example embodiment. To anticipate overflow of the FIFO memory, the oldest bit strings (or another selection of bit strings) may be discarded from the FIFO memory, as defined by an example embodiment. The advantages of these optional features are similar to the advantages explained above in relation to the presence of a FIFO memory in the remote terminal to store the bit string and subsequent bit strings before transfer from the remote terminal to the first central processing unit.

Another optional feature of the method for monitoring impulse noise according to the present invention, defined by an example embodiment, is that the bit string may be compressed through a lossless compression algorithm before transfer to said first central processing unit. An example of such lossless compression algorithms whereto the invention evidently is not restricted, is the runlength encoding algorithm mentioned in an example embodiment.

Still an optional aspect of the method according to the present invention is that the bit string or the compressed version of the bit string may be processed by the first central processing unit thereby determining impulse noise characteristics. This aspect is mentioned in an example embodiment.

The processing may involve generation of histograms of impulse noise length and/or impulse inter arrival times, with or without pulse gap bridging mechanism, with or without Fourier transforms, with or without sliding window based mechanism, cross-correlations between impulse noise length and impulse inter arrival times, determining optimal INP parameter settings, etc.

DETAILED DESCRIPTION OF EMBODIMENT(S)

Figure 1:
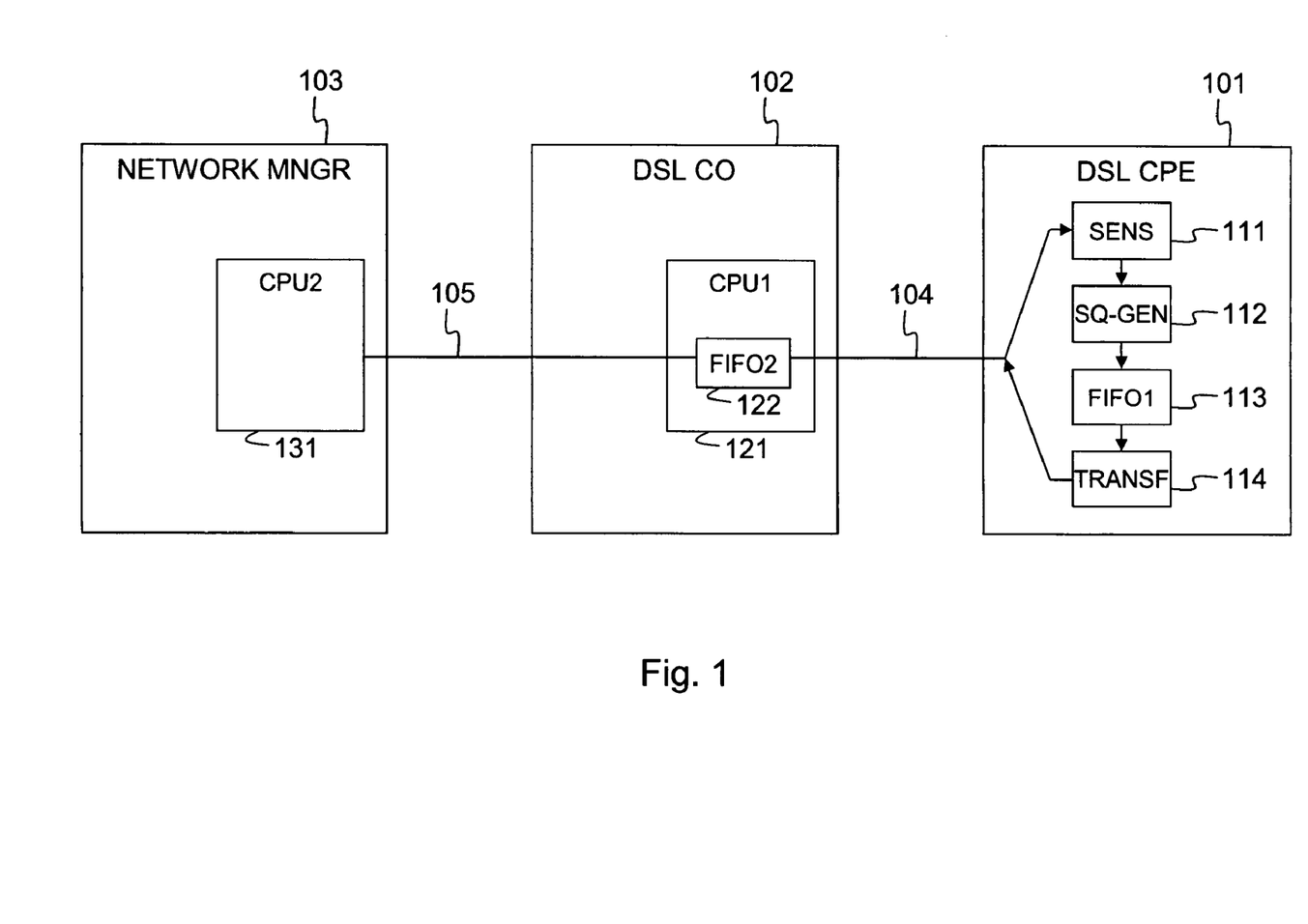
FIG. 1 illustrates an embodiment of the method for impulse noise monitoring according to the present invention in a DSL network comprising a network terminal 101, a network node 102 and a network manager 103 according to the present invention.

FIG. 1 shows a DSL CPE (Digital Subscriber Line Customer Premises Equipment) modem 101 connected to a DSL CO (Digital Subscriber Line Central Office) 102 through DSL line 104. The DSL CPE 101 can for instance be an ADSL modem or VDSL modem whereas DSL CO 102 can be a DSLAM (Digital Subscriber Line Access Multiplexer), a line termination board within a DSLAM, or an ASIC (Application Specific Integrated Circuit) integrating one or plural central office DSL modems. The DSL CPE 101 in addition to the traditional DSL CPE functionality contains a DMT symbol reception quality sensor, SENS or 111, a DMT symbol quality bit string generator, SQ-GEN or 112, a first-in-first-out memory, FIFO1 or 113, and a DMT symbol quality bit string transfer unit, TRANSF or 114. The DSL CO 102 in addition to the traditional DSL CO functionality contains a first central processing unit, CPU1 or 121, that also has a first-in-first-out memory, FIFO2 or 122. FIG. 1 further shows a DSL network manager, NETWORK MNGR or 103, equipped with a second central processing unit, CPU2 or 131.

In the downstream direction, DMT symbols are sent from the DSL CO 102 to the DSL CPE 101 over the DSL line 104. Upon receipt of these DMT symbols at the DSL CPE 101, the symbol reception quality sensor 111 senses degradation of the DMT symbol quality for each received DMT symbol, for instance through erasure detection, SNR (Signal to Noise Ratio) measurement or BER (Bit Error Rate) calculation. Based on the sensed DMT symbol quality, the symbol quality bit string generator 112 generates 1 bit per DMT symbol indicative for the degradation of the respective DMT symbol. Such bit will be called a Symbol Quality bit or SQ bit in the following paragraphs. The symbol quality bit string generator 112 thus generates a DEgraded SYmbol bit or DESY bit (e.g. a bit set 1) in case the sensed DMT symbol quality stays below a certain threshold and generates a NOn-DEgraded SYmbol bit or NODESY bit (e.g. a bit set 0) in case the reception quality of the corresponding DMT symbol exceeds that same threshold. Independent of whether these SQ bits are generated for a currently existing service or for a future service, the so generated bit strings in the case of ADSL represent a datastream of about 4 kbit/s, named the SQ stream.

The SQ bits are stored in and read out of the first-in-first-out memory 113. Thereupon, the SQ stream is sent upstream to the DSL CO 102 over the EOC (Embedded Operations Channel) management channel by the transfer unit 114. This can be done autonomously, based on an SQ start and an SQ stop command generated by the transfer unit 114 or a control unit not shown in FIG. 1, in which case a number of SQ bits are grouped together to form an SQ bit string. A header is pre-pended as will be further detailed below, and at regular intervals, the SQ bit strings are sent. Alternatively, this can be done based on requests issued by the DSL CO 102, more particularly by the central processing unit 121 therein. In the latter case, the first-in-first-out memory 113 in the DSL CPE is unavoidable to store the SQ bit strings until transfer thereof is requested by the central processing unit 121. The size of the first-in-first-out memory 113 may for instance be fixed to 32 times 4 bytes.

In general, two kinds of request messages can be distinguished for the DSL CO 102 to request transfer of the SQ bit strings by the transfer unit 114. A first type of request message, named SQ_new in the following paragraphs, asks for new SQ bit strings. In response to an SQ_new request, the transfer unit 114 sends only SQ bit strings that got stored in FIFO1 after the ones that were sent already. A second type of request message, named SQ_all in the following paragraphs, requests all SQ bit strings to be transferred, i.e. both the SQ bit strings that were asked in the previous request and the new SQ bit strings.

FIFO 1 is monitored for overflows between the previous SQ_new request and the current request. As soon as the size of FIFO1 is insufficient to store the new bit strings, i.e. bit strings that have been generated after the previous SQ_new request, old SQ bit strings are overwritten by new ones. In other words, the newest bit strings are recorded in FIFO1, whereas old bit strings are discarded. Alternatively, another set of bit strings, not necessarily the oldest bit strings, will be discarded from FIFO1 to anticipate overflow.

As an alternative to the single bit per DMT symbol mentioned here above, the SQ bit string generated by symbol quality bit string generator 112 can contain a fixed number of SQ bits per DMT symbol, a timestamp with a fixed number of SQ bits, a timestamp with a count of consecutive DESY bits (DESY count) and/or a count of consecutive NODESY bits (NODESY count), or a combination of timestamps, counts and bits.

The second option here above, i.e. the one with a timestamp, is assumed to be implemented in the system drawn in FIG. 1. This implementation allows to skip all bit strings that only contain NODESY bits. Even if a line is impacted by REIN, the amount of successive NODESY bits on a DSL line is typically in the order of 30. With a timestamp of 16 bits, a considerable data reduction can be achieved.

It is noticed that a fixed size for the bit strings reduces the complexity of the FIFO memory and since most events only have a small number of consecutive DESY bits, it may not be useful to implement a DESY count. Therefore, at the occurrence of a DESY bit, a new bit string is created by the symbol quality bit string generator 112. The timestamp indicates the sequence number of the DESY bit in the SQ stream. To obtain fixed size bit strings, only the 16 following SQ bits are put in the bit string together with the timestamp.

Advantageously, the timestamp that forms part of the SQ bit string may be encoded as the difference in sequence number compared to the last SQ bit in the previous SQ bit string. For the current bit string, it appears as the timestamp of the previous bit string minus the number of the SQ bits contained in the previous bit string. This value is called the SQ_offset. In the just described example, the SQ_offset is 17. It is further noticed that the timestamp is saturating at a maximum count.

It is noticed that a timestamp may also be created for the requests coming from the DSL CO 102. This timestamp will be referred to by SQ_request_time in the following paragraphs.

For transferring the bit strings from the transfer unit 114 in DSL CPE 101 to the central processing unit CPU1, the bit strings may be grouped in larger packets. Such a packet may for instance have a header identifying the number of bit strings in the packet. The header may for instance have 6 bits if FIFO1 is supposed to be able to store up to 32 bit strings: 0 . . . 32. In case of overflow, the header may contain a special value (e.g. 33) that indicates that there are only 32 bit strings in the packet, but that there was an overflow in FIFO1. The packet obviously also contains the SQ bit strings, starting with the oldest. The packet further optionally may contain two 32 bit counters that saturate at maximum count and have a granularity of 1 SQ bit. The first counter indicates the time since the last SQ bit of the last SQ bit string compared to the request time SQ_request_time of the current packet. The second counter indicates the time since the last SQ bit of the last SQ bit string of the previous packet that was a response to a new request SQ_new compared to the request time SQ_request_time of the current packet.

Further, an indicator bit, indicating that FIFO1 has new SQ bit strings since the last SQ_new request, may be generated. This indicator bit could for instance occupy a spare bit location in the framing overhead, e.g. the framing overhead defined in Table 9-5 of ITU-T Specification G.993.2 IB1-2. This indicator bit could for instance also be added to an EOC command that is executed frequently, like the management counter read command. A command can be created for which the response is this indicator bit.

In the first central processing unit CPU1, the received SQ bit strings are stored in a second first-in-first-out memory 122. The bit strings may be processed or compacted by CPU1. The processing or compacting may involve generation of histograms of impulse noise length and/or impulse inter arrival times, with or without pulse gap bridging mechanism, with or without Fourier transforms, with or without sliding window based mechanism, cross-correlations between impulse noise length and impulse inter arrival times, determining optimal INP parameter settings, etc.

Further, the stored SQ bit strings can be forwarded over channel 105 to the second central processing unit 131 in a network manager or network analyzer 103 that manages the entire DSLAM base of one or more DSL operators, or a part of the DSLAM base of a DSL operator. Again, the transfer of the SQ bit strings can be done autonomously (push model) or on explicit request of CPU2 (pull model), and similar to FIFO1, the second first-in-first-out memory 131 may be supplemented with read, write, discard, and overflow management functions to adequately cope with the pace at which the SQ bit strings are requested by CPU2.

Since the network manager 103 typically will manage a few thousand up to millions of DSL lines, CPU2 may be configured to request the SQ bit strings for a limited number of lines at a relatively low frequency, e.g. every 15 minutes, in order to visualize and process the SQ bit strings and generate diagnostic information enabling the operator to take remedial action on DSL lines with impulse noise problems. Bulk processing of the SQ bit strings in order to adaptively configure the INP parameters on the different DSL lines will be done closer to the DSL lines, i.e. by CPU1 on the line termination boards or in the DSLAM.

A first remark is that although the above described, preferred embodiment is implemented in a DSL network, applicability of the present invention is not limited to digital data transfer over copper loops deployed as DSL lines. Any person skilled in the art of telecommunications, will appreciate that generation of a symbol quality bit string indicative for the sensed quality of received symbols and transfer of such bit string to a CPU located centrally in the network can be applied on any non-DSL loop that suffers from impulse noise with similar advantages. Examples are wireline or wireless LAN connections, access subscriber lines, transmission lines, etc.

Another remark is that although reference is made here above to a first central processing unit in a network node, and an optional second central processing unit residing in a network manager, it is not excluded that the first central processing unit resides in a network manager. In other words, the network node hosting the first central processing unit can be a network manager or network analyzer.

Yet another remark is that DMT symbols or Discrete Multi Tone symbols referred to above, according to the international DSL standards comprise data symbols and SYNC symbols. It is noticed however that such strict interpretation does not apply to the current invention as the bit string generated according to the present invention clearly may be based on DMT symbols or on data symbols only or on SYNC symbols only. As already mentioned in the introductory part of this patent application, the bit string may even be calculated on alternate type of data packets, cells, words, symbols, etc.

It is also noticed that SQ bit string generation and transfer to a CPU in the network according to the principles of the present invention must not necessarily be permanently active. One could for instance think of an implementation where standard statistics such as the pulse duration and pulse inter arrival times are on the fly collected on each line, and where the impulse noise monitoring mode wherein an SQ bit string is generated and forwarded to a CPU in the network can be enabled/disabled, e.g. for one or two lines per line termination board. This way, more advanced diagnoses can be applied on those one or two lines, e.g. by processing the SQ bit stream in the central office or in the network management system whereto the SQ stream might be forwarded. This way, standard statistics can be used to monitor all lines and upon trouble detection, e.g. a threshold passing alarm, the operator's attention is triggered and the operator can put the line in trouble under investigation by enabling the SQ bit stream mode. Such intelligent way to collect statistics and/or the full data requires less RAM memory on the line termination boards or network location that hosts the CPU.

Further, it will be apparent to persons skilled in the art of telecom equipment that the functional blocks drawn in FIG. 1 and explained above, can be implemented in software, hardware or a combination of software and hardware.

Although the present invention has been illustrated by reference to a specific embodiment in the field of DSL networks, it will be apparent to those skilled in the art that the invention is not limited to the details of the foregoing illustrative embodiment, and that the present invention may be embodied with various changes and modifications without departing from the spirit and scope thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the spirit and scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order.

The invention claimed is:

1. A method for monitoring impulse noise in a network for digital data packet transmission, said method comprising the steps of:

sensing reception quality of received data packets;

generating a bit string indicative of said reception quality sensed, said bit string containing at least one bit per received data packet;

transferring said bit string or a compressed version of said bit string in real-time over a management channel to a first central processing unit in said network, the first central processing unit configured to at least one of compact and process the bit string or the compressed version of the bit string, the at least one of compacting and processing including generating impulse noise data;

generating one or more subsequent bit strings, similar to said bit string; and storing said bit string and said one or more subsequent bit strings or compressed versions of said bit string and said one or more subsequent bit strings in a memory at a remote end network terminal.

2. The method for monitoring impulse noise according to claim 1, wherein said bit string or said compressed version of said bit string is transferred over a physical layer management channel to said first central processing unit.

3. The method for monitoring impulse noise according to claim 2, wherein said bit string or said compressed version of said bit string is transferred over the Digital Subscriber Line Embedded Operations Channel (EOC).

4. The method for monitoring impulse noise according to claim 2, wherein said bit string or said compressed version of said bit string is transferred over a TR-069 protocol based management channel.

5. The method for monitoring impulse noise according to claim 1, wherein said bit string contains one bit per received data packet, said one bit being indicative of said reception quality in said received data packet passing a certain threshold.

6. The method for monitoring impulse noise according to claim 1, wherein said bit string contains plural bits per received data packet, said plural bits being a quality indication of said received data packet.

7. The method for monitoring impulse noise according to claim 1, wherein said method is performed by Digital Subscriber Line Customer Premises Equipment, and said received data packets correspond to Discrete Multi-Tone (DMT) symbols.

8. The method for monitoring impulse noise according to claim 7, wherein said bit string or said compressed version of said bit string is transferred to a first central processing unit in a Digital Subscriber Line Central Office.

9. The method for monitoring impulse noise according to claim 8, wherein said bit string or said compressed version of said bit string is transferred to a first central processing unit on a line termination board in said Digital Subscriber Line Central Office.

10. The method for monitoring impulse noise according to claim 1, wherein said method further comprises the step of:

regularly autonomously transferring said bit string or said compressed version of said bit string from a remote end network terminal to said first central processing unit.

11. The method for monitoring impulse noise according to claim 1, wherein said method further comprises the step of:

regularly autonomously requesting transfer of said bit string or said compressed version of said bit string by said first central processing unit.

12. The method for monitoring impulse noise according to claim 1, wherein said method further comprises the steps of:

sending an indication signal to said first central processing unit after generation of said bit string; and upon request of said first central processing unit, transferring said bit string or said compressed version of said bit string to said first central processing unit.

13. The method for monitoring impulse noise according to claim 1, wherein the memory is a first-in-first-out memory and said method further comprises the step of:

transferring one or more of said bit string and said subsequent bit strings or one or more compressed versions of said bit string and said subsequent bit strings at a time from said first-in-first-out memory to said first central processing unit.

14. The method for monitoring impulse noise according to claim 13, wherein said method further comprises the step of:

removing said one or more of said bit string and said subsequent bit strings or said one or more compressed versions of said bit string and said subsequent bit strings from said first-in-first-out memory after transfer thereof to said first central processing unit.

15. The method for impulse noise monitoring according to claim 13, wherein said method further comprises the step of:

removing said one or more of said bit string and said subsequent bit strings or said one or more compressed versions of said bit string and said subsequent bit strings from said first-in-first-out memory after acknowledgement of correct reception of respectively said one or more of said bit string and said subsequent bit strings or said one or more compressed versions of said bit string and said subsequent bit strings by said first central processing unit.

16. The method for impulse noise monitoring according to claim 1, wherein the memory is a first-in-first-out memory and said method further comprises the step of:

discarding one or more of said bit string and said subsequent bit strings or one or more compressed versions of said bit string and said subsequent bit strings from said first-in-first-out memory upon overflow of said first-in-first-out memory.

17. The method for monitoring impulse noise according to claim 1, wherein said method further comprises the step of:

regularly autonomously transferring said bit string or said compressed version of said bit string or a compacted bit string from said first central processing unit to a second central processing unit in a network manager.

18. The method for monitoring impulse noise according to of claim 17, wherein said method further comprises the steps of:

transferring said one or more subsequent bit strings or compressed versions of said one or more subsequent bit strings also to said first central processing unit;

storing said bit string and said one or more subsequent bit strings or said compressed versions of said bit string and said one or more subsequent bit strings in a first-in-first-out memory at said first central processing unit; and transferring one or more of said bit string and said subsequent bit strings or compressed versions of said bit string and said subsequent bit strings or compacted versions of said bit string and said subsequent bit strings at a time from said first-in-first-out memory in said first central processing unit to said second central processing unit.

19. The method for monitoring impulse noise according to claim 18,
wherein said method further comprises the step of:
removing said bit string and said one or more of said subsequent bit strings or compressed versions of said bit string and said one or more of said subsequent bit strings from said first-in-first-out memory after transfer of respectively said bit string and said one or more of said subsequent bit strings or compressed versions of said bit string and said one or more of said subsequent bit strings or compacted versions of said bit string and said one or more of said subsequent bit strings to said second central processing unit.

20. The method for monitoring impulse noise according to claim 18,
wherein said method further comprises the step of:
removing said bit string and said one or more of said subsequent bit strings or compressed versions of said bit string and said one or more of said subsequent bit strings from said first-in-first-out memory after acknowledgement of correct reception of respectively said bit string and said one or more of said subsequent bit strings or compressed versions of said bit string and said one or more of said subsequent bit strings or compacted versions of said bit string and said one or more of said subsequent bit strings by said second central processing unit.

21. The method for monitoring impulse noise according to claim 1,
wherein said method further comprises the step of:
regularly autonomously requesting to said first central processing unit transfer of said bit string or said compressed version of said bit string or a compacted bit string by a second central processing unit in a network manager.

22. The method for monitoring impulse noise according to claim 1,
wherein said method further comprises the steps of:
sending an indication signal to a second central processing unit in a network manager upon event detection by said first central processing unit compacting or processing said bit string or said compressed version of said bit string; and
upon request of said second central processing unit, transferring said bit string or said compressed version of said bit string or a compacted version of said bit string from said first central processing unit to said second central processing unit.

23. The method for monitoring impulse noise according to claim 1,
wherein said method further comprises the steps of:
transferring said one or more subsequent bit strings or compressed versions of said one or more subsequent bit strings also to said first central processing unit; and
storing said bit string and said one or more subsequent bit strings or said compressed versions of said bit string and said one or more subsequent bit strings in a first-in-first-out memory at said first central processing unit.

24. The method for monitoring impulse noise according to claim 23,
wherein said method further comprises the step of:
discarding one or more of said bit string and said subsequent bit strings or one or more compressed versions of said bit string and said subsequent bit strings from said first-in-first-out memory upon overflow of said first-in-first-out memory.

25. A method for monitoring impulse noise according to claim 1,
wherein said method further comprises the step of:
compressing said bit string through a lossless compression algorithm thereby generating said compacted version of said bit string before transfer to said first central processing unit.

26. A method for monitoring impulse noise according to claim 25,
wherein said bit string is compressed using the runlength encoding algorithm.

27. A method for monitoring impulse noise according to claim 1,
wherein said method further comprises the steps of:
processing said bit string or said compressed version of said bit string by said first central processing unit thereby determining impulse noise characteristics.

28. Network terminal for digital data packet transmission, said network terminal being able to monitor impulse noise in received data packets and thereto comprising:
means for sensing reception quality of received data packets;
means for generating a bit string indicative of said reception quality sensed, said bit string containing at least one bit per received data packet, and configured to generate one or more subsequent bit strings, similar to said bit string;
wherein said network terminal further comprises:
means for transferring said bit string or a compressed version of said bit string in real-time over a management channel to a first central processing unit in said network for compacting and/or processing thereof; and
a first-in-first-out memory configured to store said bit string and said one or more subsequent bit strings or compressed versions of said bit string and said one or more subsequent bit strings.

29. Network node for use in a network for digital data packet transmission,
wherein said network node comprises:
means for receiving a bit string indicative of sensed reception quality of data packets, said bit string containing at least one bit per data packet, or a compressed version of said bit string, in real-time from a management channel; and
a first central processing unit configured to compact and/or process said bit string or said compressed version of said bit string, the first central processing unit including a first-in-first-out memory configured to store said bit string and one or more subsequent bit strings or said compressed versions of said bit string and said one or more subsequent bit strings.

30. The network node according to claim 29,
wherein said first central processing unit is adapted to process said bit string or said compressed version of said bit string to thereby determine impulse noise characteristics.

* * * * *